United States Patent [19]

Yamada

[11] Patent Number: 5,008,947
[45] Date of Patent: Apr. 16, 1991

[54] METHOD AND APPARATUS FOR CORRECTING EXTENSION RATES OF IMAGES

[75] Inventor: Naoki Yamada, Nishinasunomachi, Japan

[73] Assignee: Kabushiki Kaisha Toshiba, Kawasaki, Japan

[21] Appl. No.: 419,114

[22] Filed: Oct. 10, 1989

[30] Foreign Application Priority Data

Oct. 13, 1988 [JP] Japan .................................. 63-257692

[51] Int. Cl.$^5$ .......................... G06K 9/00; G06K 9/32; H05G 1/28
[52] U.S. Cl. .......................................... 382/6; 384/44; 384/46; 384/47; 378/162; 378/163
[58] Field of Search .................... 378/162, 163; 382/6, 382/44, 45, 47, 46

[56] References Cited

U.S. PATENT DOCUMENTS

| | | | |
|---|---|---|---|
| 4,564,861 | 1/1986 | Hishinuma | 378/162 |
| 4,710,875 | 12/1987 | Nakajima | 378/162 |
| 4,850,028 | 6/1989 | Kawamura | 382/47 |

Primary Examiner—Leo H. Boudreau
Assistant Examiner—Steven P. Fallon
Attorney, Agent, or Firm—Finnegan, Henderson, Farabow, Garrett, and Dunner

[57] ABSTRACT

Positions of marker images included in two images obtained by a digital radiography system are detected by a marker position detecting section. The marker image intervals in each image are calculated by an extension rate correcting section in accordance with the detected positions of the marker images. Reduction/extension for one image is perfomed in accordance with the extension rate of the image obtained by a ratio of the calculated marker image intervals, thereby coinciding extension rates of two images.

10 Claims, 4 Drawing Sheets

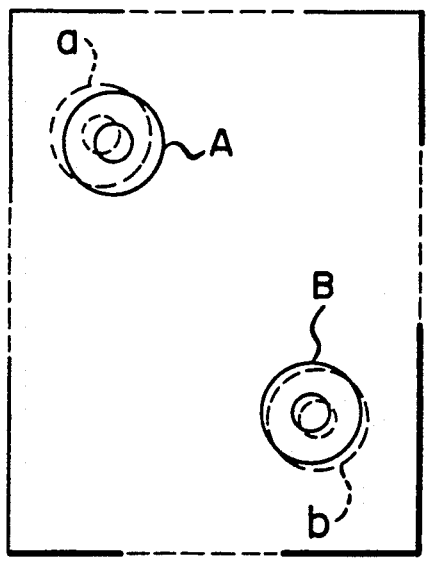
F I G. 5
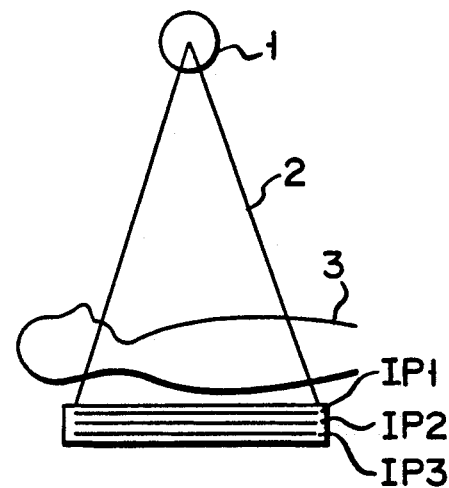
F I G. 9
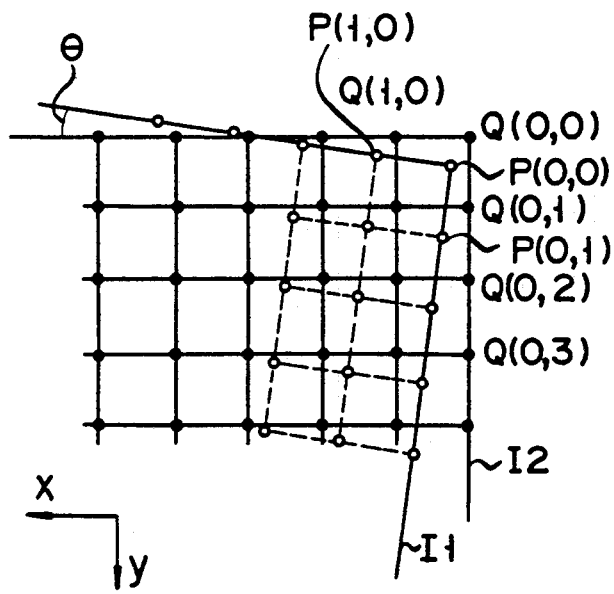
F I G. 7
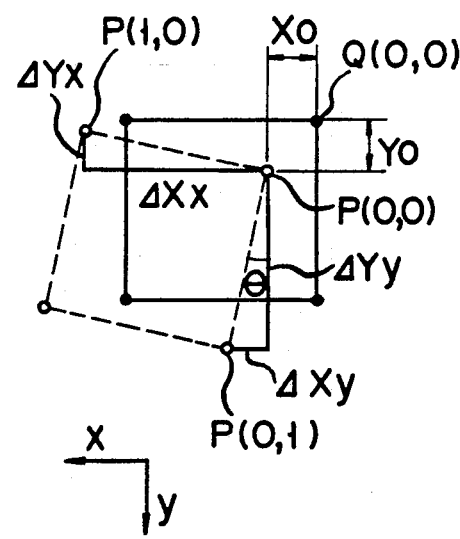
F I G. 8

METHOD AND APPARATUS FOR CORRECTING EXTENSION RATES OF IMAGES

BACKGROUND OF THE INVENTION

1. Field of the Invention

The present invention relates to a method and system for correcting extension rates of images.

2. Description of the Related Art

In the digital radiography system, there has been employed an energy subtraction process. In the process, two images formed by different energies are subtracted each other, and the difference thus obtained is visually presented. Two methods, a one-shot method and a two-shot method, have been used for taking X-ray images in use for the energy subtraction process.

In the two-shot method, an X-ray tube is set at a low voltage, and an object is irradiated with the X-rays emitted from the X-ray tube. Then, the X-ray tube is set at a high voltage, and the object is irradiated with the X-rays emitted from the X-ray tube. By the above process, two images by different energies are obtained.

In the one-shot method, a pair of imaging plates (IPs) sandwiching an X-ray absorption material such as cooper are used. The X-ray tube radiates one shot of X-rays to an object. Accordingly, as existence of the x-ray absorption material between the IPs causes a difference between the energies radiated to the IPs, two images by different energies are obtained.

By the above two methods, an image of the soft part tissue except for the bone or an image of the bone except for the soft part tissue can be obtained. The larger the energy difference between two images is, the easier the subtraction process is. To perfectly separate the bone from the soft part tissue, therefore, the two-shot method is superior to the one-shot method.

Apparatuses for switching the X-ray tube voltage at a high speed and moving the two IPs at a high speed to obtain two images, are necessary to the two-shot method. When an object respires, a motion of the object causes a position shift between two images.

In the one-shot method, an energy difference between the two images is small. However, as the images are formed on the basis of one-shot radiation of X-rays, the position shift between the images does not occur. Further, switching apparatus and IP moving apparatus are not required.

To apply the subtraction process to the two images, the image position fitting process is performed by moving and rotating one image with respect to the other image.

In the two-shot method, a distance between the X-ray tube and the IP is constant for the two-shot radiations. Accordingly, the two images are equal in size, or extension rate. Therefore, the images can be position-fit by the above fitting process.

In the one-shot method, a distance between one IP and an object is different from that between the other IP and the object by the thickness of the X-ray absorption material. Accordingly, the extension rate of one image is different from that of the other image. For this reason, the images cannot be position-fit by only the above fitting process. If the subtraction process is applied to the images having different extension rates, a contour of the tissue, which is to be removed is left according to the extension rate, thereby reducing a resolution of the image.

It is demanded that an apparatus capable of improving the resolution of the images by correcting a position shift in accordance with different extension rates of the images.

SUMMARY OF THE INVENTION

It is an object of the present invention to provide a method and system for correcting extension rates of images.

According to one aspect of the present invention, there is provided a method for correcting extension rates of images, the method comprising the steps of:

acquiring a plurality of images, each image including a plurality of marker images;

detecting positions of the marker images on each image;

calculating marker image intervals from the detected positions of the marker images;

selecting a standard image from the plurality of images;

fitting an image position of at least one remaining image to that of the standard image;

obtaining the extension rates from the calculated marker image intervals between the selected standard image and the remaining image; and correcting extension rates of the remaining image in accordance with the obtained extension rates.

According to another aspect of the present invention, there is provided a system for correcting extension rates of images, the system comprising:

acquiring means for acquiring a plurality of images, each image including a plurality of marker images;

detecting means for detecting positions of the marker images on each image;

calculating means for calculating marker image intervals from the detected positions of the marker images;

selecting means for selecting a standard image from the plurality of images;

fitting means for fitting an image position of at least one remaining image to that of the selected standard image;

obtaining means for obtaining the extension rates from the calculated marker image intervals between the selected standard image and the remaining image; and correcting means for correcting extension rates of the remaining image in accordance with the obtained extension rate.

BRIEF DESCRIPTION OF THE DRAWINGS

FIG. 5 shows a diagram for explaining a shift of the marker images by the difference of the extension rates between the two images;

FIGS. 7 and 8 show diagrams for explaining the extension rate correcting process for two digitized images; and FIG. 9 shows a schematic illustration of another embodiment of the present invention.

DETAILED DESCRIPTION OF THE PREFERRED EMBODIMENTS

Preferred embodiments of the present invention will be described with reference to the accompanying drawings.

Figure 1:
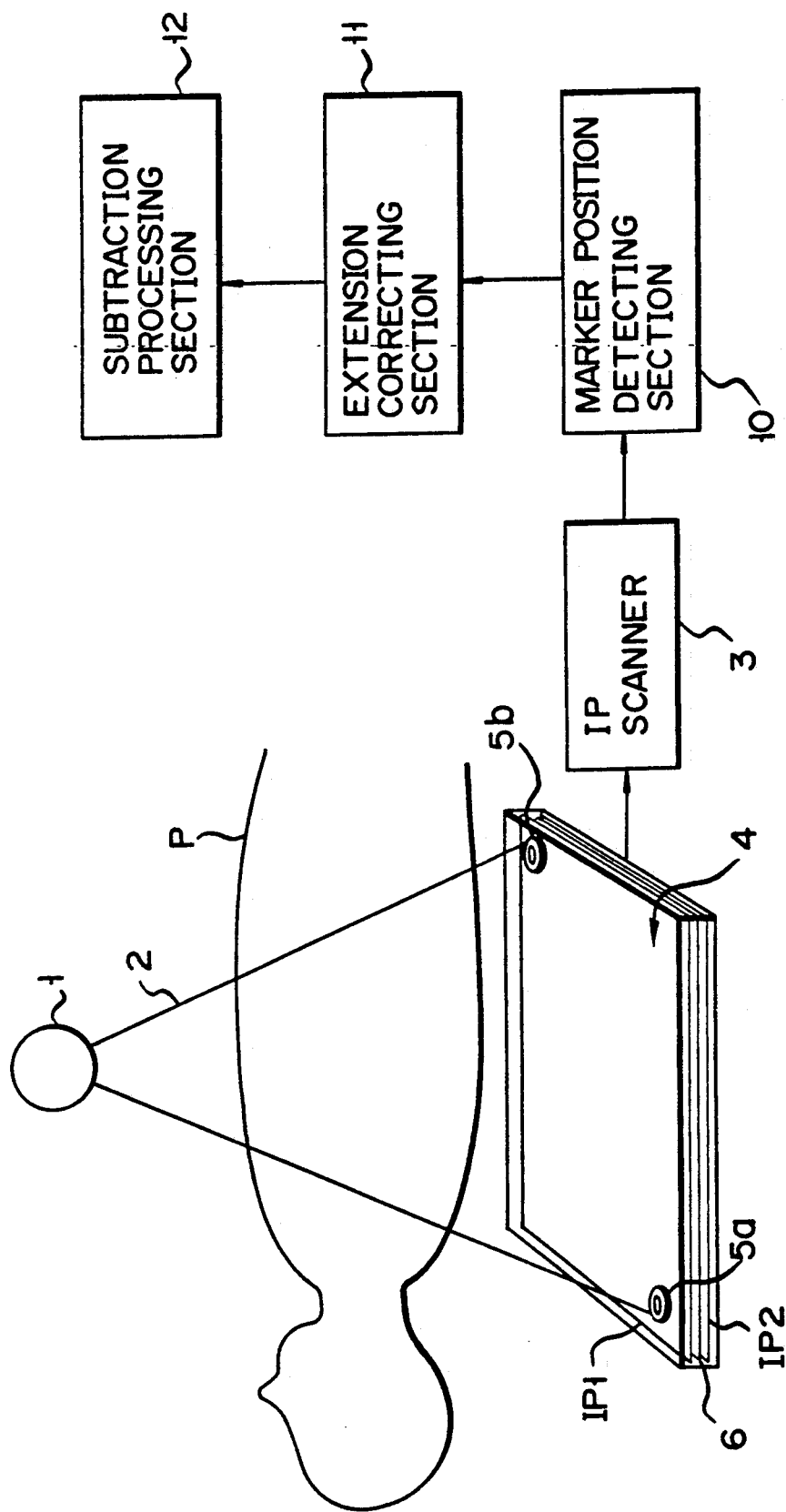
FIG. 1 shows a scheme of a system for correcting extension rates of images according to an embodiment of the present invention.

In the present system according to one shot method, as shown in FIG. 1, an X-ray tube 1 emits a fan beam 2 toward a subject P. A cassette 4 contains IP1 and IP2. An X-ray absorption material 6, for example, a copper plate, is sandwiched between IP1 and IP2. Markers 5a and 5b are attached to the left upper corner and the right lower corner of the cassette 4.

Figure 2A:
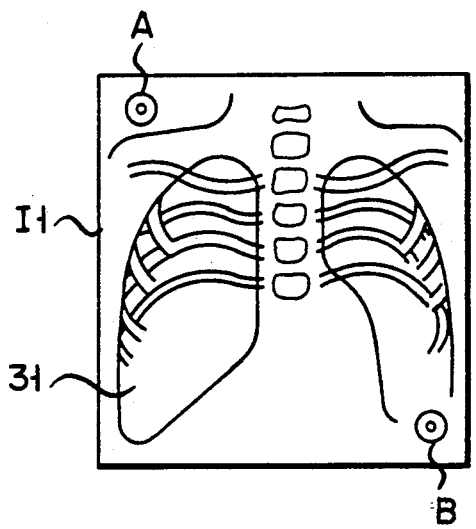
FIGS. 2A and 2B are diagrams showing two images to be subjected to the subtraction process.
Figure 2B:
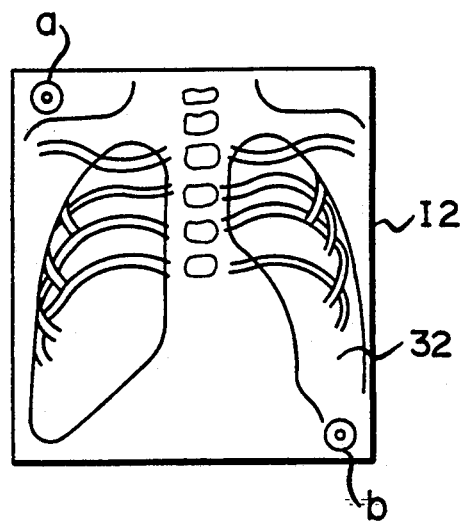

An IP scanner 3 reads X-ray information temporarily recorded in the IP1 and IP2. A marker position detecting section 10 detects positions of marker images A, B, a, and b formed at the corners of two images I1 and I2, as shown in FIGS. 2A and 2B.

An extension rate correcting section 11 calculates marker image intervals by using the positions of the marker images A, B, a and b detected by the marker position detecting section 10, as described later. Further, the extension rate correcting section 11 calculates a ratio of the marker image intervals of the two images, to acquire an extension rate. The image is extended or reduced in accordance with the extension rate. A subtraction processing section 12 performs the subtraction process to the two images having extension rates corrected by the extension rate correcting section 11.

The operation of the system for correcting extension rates of images will be described.

The fan beam 2 generated in the X-ray tube 1 is radiated to the subject P. The IP1 and IP2 of the cassette 4 temporarily record X-ray information. Two images I1 and I2 having subject images 31 and 32, and marker images A, B, a and b are acquired by reading the X-ray information recorded in IP1 and IP2 by the IP scanner 3. The forms of the marker images are recognized by the marker position detecting section 10, thereby to detect the positions of the four marker images.

Figure 3:
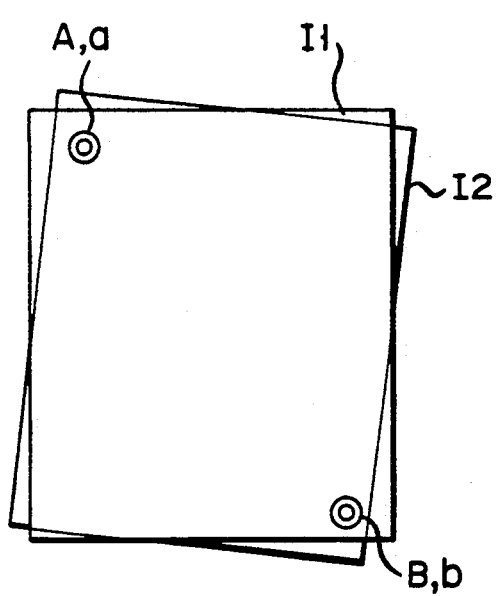
FIG. 3 shows a diagram for explaining the position-fitting of two images by using marker images.

As shown in FIG. 3, positions of the two images I1 and I2 are shifted with respect to each other, and accordingly the positions of marker images A and B in the image I1 are fit to the positions of marker images a and b in the image I2. To fit positions of the images I1 and I2, the image I2 is moved and rotated.

Figure 4:
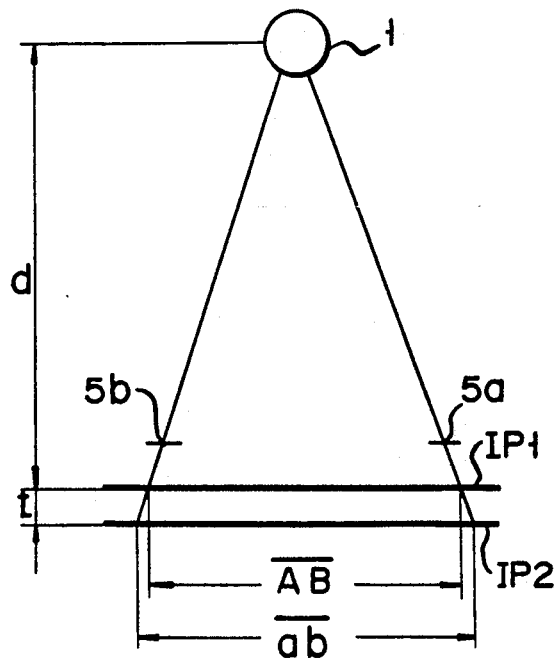
FIG. 4 shows a diagram for explaining the difference of extension rates between two images formed by radiation of a fan beam.

In the one-shot method, as the extension rates of the images I1 and I2 change depending on the thickness "t" of the X-ray absorption material 6, as shown in FIG. 4, the marker image interval $\overline{AB}$ is different from that $\overline{ab}$ ($\overline{AB} < \overline{ab}$). If the subtraction process is performed to the two images formed by the one-shot method, the marker images A and a, and B and b are shifted with respect to each other, as shown in FIG. 5. Therefore, the subject images I1 and I2 are also shifted with respect to each other. In the shift, the following relation equation is obtained. That is, $$AB/d = ab/(d+t)$$

where d is the distance between the X-ray tube 1 and the IP1. When d=1 m and t=1 mm, $\overline{ab}/\overline{AB}=1.001$. This indicates that the marker image interval $\overline{AB}$ is shorter by 0.1% than the interval $\overline{ab}$. In the digital radiography system, as the interval $\overline{AB}$ consists of 2000 pixels, 0.1% corresponds to 2 pixels. Accordingly, the marker images A and a are shifted by 1 pixel. The images B and b are also shifted by 1 pixel.

In the subtraction process by the subtraction processing section 12, the image I2 is moved and rotated, and the image I2 is reduced by $\overline{AB}/\overline{ab}$ in the extension rate correcting section 11.

The extension rate correcting process by the extension rate correcting section 11 will be described with reference to a flowchart of FIG. 6.

In FIG. 7, note that the image I1 is fixed, and the image I2 is moved and rotated, and it is reduced in size. The images I1 and I2 are based on the digital image data, and coordinates of each image data are expressed by P(i, j) and Q(i, j) where i=X direction and j=Y direction.

Figure 6:
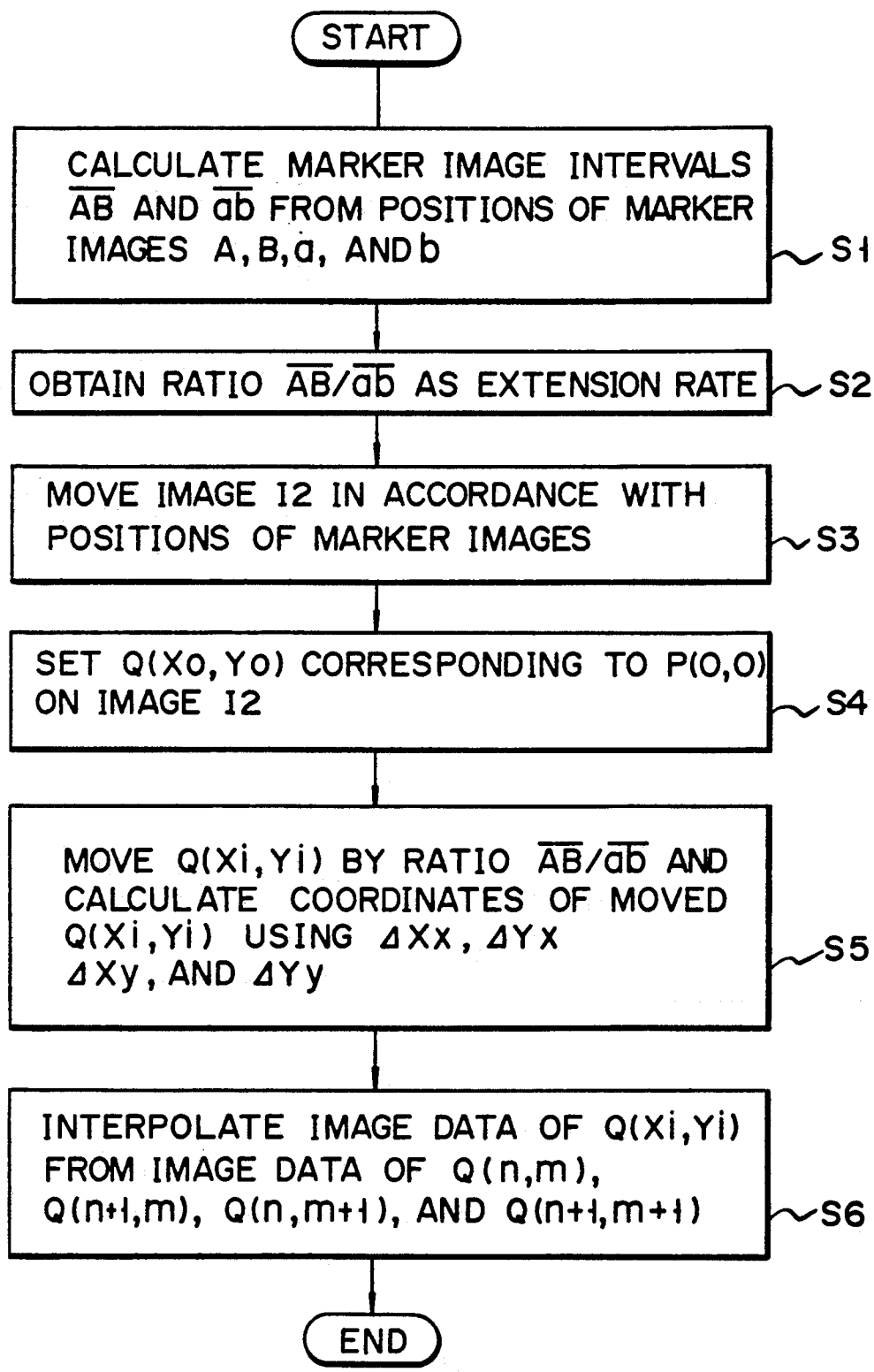
FIG. 6 shows an operation flowchart of an extension rate correcting section of the system of FIG. 1.

The marker image intervals $\overline{AB}$ and $\overline{ab}$ are calculated by using the position of the marker image A, B, a, and b in step S1 of FIG. 6. A ratio of the marker image interval $\overline{AB}/\overline{ab}$ is obtained as an extension rate in step S2. In the step S3, the image I2 is moved in accordance with the detected positions of marker images, to fit the I2 to I1. In step S4, the coordinates Q(X0, Y0) corresponding to the coordinates P(0, 0) on the images I1 are set on the image I2. In step S5, the coordinate Q(Xi, Yi) on the image I2 are moved. The coordinates is calculated from the coordinates Q(X0, Y)) as a start point. As shown in FIG. 8, when the coordinates Q(Xi, Yi) are moved by +1 in the X direction on the image I2, the amounts of change of the coordinates on the image I2 and ΔXx and ΔYx, and the coordinates Q(Xi, Yi) are moved by +1 in the Y direction on the image I2, the amounts of changes of the coordinates on the image I2 are ΔXy and ΔYy.

The four amounts of change are selected so as to satisfy the following relation. That is, $$\Delta Yx/\Delta Xx < \Delta Xy/\Delta Yy = \tan\theta$$

where $\theta$ is an angle of rotating the image. The amounts of change are calculated by:

$$\sqrt{\Delta Xx + \Delta Yx} = \sqrt{\Delta Xy/\Delta Yy} = 1 \text{ (no correction for extension rate)},$$

$$\sqrt{\Delta Xx + \Delta Yx} = \sqrt{\Delta Xy/\Delta Yy} = AB/ab \text{ (correction for extension rate)},$$

thereby acquiring the coordinates.

In step S6, the coordinates Q(i, j) of the image I2, corresponding to the coordinates P(i, j) of the image I1, are obtained. The coordinates Q(Xi, Yi) of the image I2 are acquired by selecting four points of coordinates Q(n, m), Q(n+1, m), Q(n, m+1) and Q(n+1, m+1), which are located near the coordinates Q(Xi, Yi) and interpolating the image data of coordinates Q(Xi, Yi) using those coordinates. Here, n≦Xi≦n+1, M≦Yi≦m+1.

Accordingly, the images I1 and I2 can be properly fit by correcting the extension rate of the image I2.

Following the correction of the extension rates of the images by the extension rate correcting section 11, the subtraction process is further performed to the image data of P(i, j) and Q(i, j) by the subtraction processing section 12. The subtraction image does not include image data representing a contour of the tissue, which is to be removed, thereby improving resolution of the image.

In the present embodiment, the extension rate of the two images is obtained by the calculation of the marker image intervals of the two images. The extension rate is multiplied to the image data of one of the images. The multiplied image corresponds to the extension or reduction image. In this way, the two images fit each other.

Thus, a shift of the images due to the difference of the extension rates, can be corrected. The corrected image does not include image data representing the contour occurred by the shift. Further, by shortening of the distance between the X-ray tube and the IP1 and IP2, a required dosage of X-rays may be reduced, thereby obtaining the distinct image.

X-ray absorption materials outside copper and tin can be used.

While the present invention has been described in connection with the energy subtraction process, it is evident that the present invention may, be embodied in connection with other process outside the subtraction process.

The present invention can be applied to the multiple photography where three or more images of different extension rates are added/subtracted. For example, as shown in FIG. 9, a cassette containing IP1, IP2, and IP3 is used. The image data recorded in those IPs is read and added together. Accordingly, a high quality image enough to ensure a diagnosis is obtained by a low dosage of X-rays.

In the above-mentioned embodiment, the extension rates are automatically corrected by using markers, but if required, the extension rates may manually be set and corrected.

It should be understood that the present invention is not limited to the above-mentioned embodiments, but may variously be changed and modified within the scope of the present invention.

What is claimed is:

1. A method for reducing and expanding images, the method comprising the steps of:
   acquiring a plurality of images, each image including a plurality of marker images;
   detecting positions of the marker images on each image;
   calculating marker image intervals from the detected marker image positions;
   selecting one of the plurality of images as a standard image;
   fitting a position of a remaining image to that of the standard image by a rotation and shift process, the remaining image being one of the plurality of images other than the standard image;
   obtaining an extension rate from the calculated marker image intervals of the marker image positions of the selected standard image and the remaining image; and
   reducing or expanding the remaining image in accordance with the obtained extension images in a predetermined interval.

2. The method according to claim 1, including the step of forming the marker images on the images in a predetermined interval.

3. A system for reducing or expanding images, the system comprising:
   acquiring means for acquiring a plurality of images, each image including a plurality of marker images;
   detecting means for detecting positions of the marker images on each image;
   calculating means for calculating marker image intervals from the detected marker image positions;
   selecting means for selecting one of the plurality of images as a standard image;
   fitting means for fitting a position of a remaining image to that of the selected standard image by a rotation and shift process, the remaining image being one of the plurality of images other than the standard image;
   obtaining means for obtaining an extension rate from the calculated marker image intervals of the marker image positions of the selected standard image and the remaining image; and
   reducing/expanding means for reducing or expanding the remaining image in accordance with the obtained extension rate.

4. The system according to claim 3, including means for forming the marker images on the images in a predetermined interval.

5. A method for reducing and expanding images, the method comprising the steps of:
   acquiring a plurality of images, each image including a plurality of marker images;
   detecting positions of the marker images on each image;
   selecting one of the plurality of images as a standard image;
   fitting a position of at least one remaining image to that of the standard image by a rotation and shift process, the remaining image being one of the plurality of images other than the standard image; and
   obtaining an extension rate of the remaining image by calculating marker image intervals from the detected marker image positions to reduce or expand the remaining image.

6. The method according to claim 5, wherein the obtaining step includes the steps of:
   calculating marker image intervals from the detected marker image positions; and
   acquiring a ratio of the calculated marker image intervals of the marker image positions of the selected standard image and the remaining image, the ratio corresponding to the extension rate.

7. The method according to claim 5, including the step of forming the marker images on the images in a predetermined interval.

8. The method according to claim 1, wherein the step of reducing or expanding the remaining image includes the step of reducing or expanding the remaining image when the marker image interval of the marker image positions of the standard image is different from that of the remaining image.

9. The system according to claim 3, wherein the reducing/expanding means includes means for reducing or expanding the remaining image when the marker image interval of the marker image positions of the standard image is different from that of the remaining image.

10. The method according to claim 5, wherein the step of obtaining the extension rate includes the step of reducing or expanding the remaining image when the marker interval of the marker image positions of the standard image is different from that of the remaining image.

* * * * *

UNITED STATES PATENT AND TRADEMARK OFFICE
CERTIFICATE OF CORRECTION

PATENT NO. : 5,008,947
DATED : April 16, 1991
INVENTOR(S) : Naoki Yamada

It is certified that error appears in the above-indentified patent and that said Letters Patent is hereby corrected as shown below:

On the Title page, item [54], in the Title, change "APPARATUS" to -- SYSTEM --; and Claim 1, column 5, line 62 change "images in a pre-determined interval" to --rate--.

Signed and Sealed this

Fifteenth Day of June, 1993

Attest:

MICHAEL K. KIRK

Attesting Officer

Acting Commissioner of Patents and Trademarks